(12) United States Patent
Groote et al.

(10) Patent No.: US 9,598,578 B1
(45) Date of Patent: Mar. 21, 2017

(54) POLYCARBONATE-POLYSILOXANE COPOLYMER COMPOSITIONS, ARTICLES FORMED THEREFROM, AND METHODS OF MANUFACTURE THEREOF

(71) Applicant: SABIC GLOBAL TECHNOLOGIES B.V., Bergen Op Zoom (NL)

(72) Inventors: Ramon Groote, Oisterwijk (NL); James Franklin Hoover, Evansville, IN (US); Robert Dirk Van De Grampel, Tholen (NL); Mark Adrianus Johannes Van Der Mee, Breda (NL); Remco Wirtz, Bergen Op Zoom (NL); Jian Yang, Shanghai (CN); Junhua Zhang, Breda (NL)

(73) Assignee: SABIC GLOBAL TECHNOLOGIES B.V, Bergen Op Zoom (NL)

( * ) Notice: Subject to any disclaimer, the term of this patent is extended or adjusted under 35 U.S.C. 154(b) by 0 days.

(21) Appl. No.: 14/943,714

(22) Filed: Nov. 17, 2015

(51) Int. Cl.
C08L 69/00 (2006.01)
C08L 83/10 (2006.01)
C08G 64/18 (2006.01)

(52) U.S. Cl.
CPC ............ C08L 83/10 (2013.01); C08G 64/186 (2013.01); C08L 69/00 (2013.01); C08L 2205/025 (2013.01); C08L 2205/03 (2013.01); C08L 2205/035 (2013.01)

(58) Field of Classification Search
None
See application file for complete search history.

(56) References Cited

U.S. PATENT DOCUMENTS

| | | | |
|---|---|---|---|
| 4,746,701 A | 5/1988 | Kress et al. | |
| 5,530,083 A | 6/1996 | Phelps et al. | |
| 6,723,864 B2* | 4/2004 | Silva | C08G 77/24 556/416 |
| 6,822,041 B2 | 11/2004 | Schottland et al. | |
| 7,135,538 B2 | 11/2006 | Glasgow et al. | |
| 7,166,687 B2 | 1/2007 | Venderbosch et al. | |
| 7,232,865 B2 | 6/2007 | DeRudder et al. | |
| 7,498,388 B2 | 3/2009 | Davis et al. | |
| 7,553,895 B2 | 6/2009 | An et al. | |
| 7,790,292 B2 | 9/2010 | Colborn et al. | |
| 7,928,168 B2 | 4/2011 | Li et al. | |
| 8,039,575 B2 | 10/2011 | Isozaki et al. | |
| 8,202,938 B2 | 6/2012 | Lee et al. | |
| 8,426,015 B2 | 4/2013 | Horisawa et al. | |
| 8,466,249 B2 | 6/2013 | Gallucci et al. | |
| 8,552,096 B2 | 10/2013 | Li et al. | |
| 8,962,780 B2 | 2/2015 | Higaki et al. | |
| 9,006,324 B2 | 4/2015 | Sybert et al. | |
| 9,023,912 B2 | 5/2015 | Morizur et al. | |
| 2004/0039145 A1* | 2/2004 | Silva | C08G 77/448 528/25 |
| 2005/0085580 A1 | 4/2005 | Marugan et al. | |
| 2006/0014919 A9* | 1/2006 | Venderbosch | C08L 69/00 528/196 |
| 2009/0023871 A9 | 1/2009 | Fujiguchi et al. | |
| 2009/0088514 A1 | 4/2009 | Shiping | |
| 2012/0252985 A1 | 10/2012 | Rosenquist et al. | |
| 2012/0273738 A1 | 11/2012 | Sybert et al. | |
| 2014/0027531 A1 | 1/2014 | Rapchak | |
| 2014/0058023 A1 | 2/2014 | Wan et al. | |
| 2014/0179821 A1 | 6/2014 | Morizur et al. | |
| 2014/0179843 A1 | 6/2014 | Van Der Mee et al. | |
| 2014/0234629 A1 | 8/2014 | Sun et al. | |
| 2014/0326162 A1 | 11/2014 | Van Der Mee et al. | |

(Continued)

FOREIGN PATENT DOCUMENTS

EP 0524731 A1 1/1993
EP 0524731 B1 3/2002

(Continued)

OTHER PUBLICATIONS

Ahmad et al; "Highly transparent thermoplastic elastomer from isotactic polypropylene and styrene/ethylene-butylene/styrene triblock copolymer: Structure-property correlations"; Polymer Engineering & Science; vol. 50, No. 2; 2010; pp. 331-341.

Chen et al; "Effects of structure and annealing on the surface composition of multiblock copolymers of bisphenol A polycarbonate and poly(dimethylsiloxane)"; Macromolecules; vol. 26, No. 17; 1993; pp. 4601-4605.

Chen et al; "Surface Modification of Polymers by Blending Siloxane Block Copolymers"; Macromolecules; vol. 27, No. 12; 1994; pp. 3393-3369.

Choi et al; "Rheological properties and thermal degradation behaviors of sonochemically treated polycarbonate/polysiloxanes blends"; Korea-Australia Rheology Journal; vol. 20, No. 4; Dec. 2008; pp. 245-251.

Kim et al; "Surface and wear behavior of bis-(4-hydroxyphenyl)cyclohexane(bis-Z) polycarbonate/polycarbonate-polydimethylsiloxane block copolymer alloys"; Polymer; vol. 43, No. 25; 2002; pp. 7207-7217.

(Continued)

Primary Examiner — David Buttner
(74) Attorney, Agent, or Firm — Cantor Colburn LLP

(57) ABSTRACT

A polycarbonate composition comprises: a first poly(carbonate-siloxane) copolymer comprising carbonate units and siloxane units, wherein less than 0.5 mol % of the siloxane units are directly coupled to another siloxane unit; the first poly(carbonate-siloxane) copolymer comprising siloxane units with an average block length of about 10 to about 100, and a siloxane content from 5 wt % to 8 wt %; a second poly(carbonate-siloxane) copolymer comprising carbonate units and siloxane units, wherein less than 0.5 mol % of the siloxane units are directly coupled to another siloxane unit; the second poly(carbonate-siloxane) copolymer comprising siloxane units with an average block length of 10 to 100, a siloxane content from 10 wt % to 30 wt %, and wherein the weight ratio of the first poly(carbonate-siloxane) copolymer to the second poly(carbonate-siloxane) copolymer is 2 to 20; and optionally a bisphenol polycarbonate; wherein the polycarbonate composition has a total siloxane content of 2.5 wt % to 10 wt % and a molded part of 1 mm thickness has a haze of less than 2% as measured by HazeGard (ASTM D1003-00).

20 Claims, No Drawings

(56) References Cited

U.S. PATENT DOCUMENTS

| | | |
|---|---|---|
| 2014/0357781 A1 | 12/2014 | Yang et al. |
| 2015/0018477 A1 | 1/2015 | Lee et al. |
| 2015/0119483 A1 | 4/2015 | Sybert et al. |

FOREIGN PATENT DOCUMENTS

| | | |
|---|---|---|
| JP | 2011102364 A | 5/2011 |
| WO | 2013175448 A1 | 11/2013 |
| WO | 2014032616 A1 | 3/2014 |
| WO | 2014072923 A1 | 5/2014 |
| WO | 2014136879 A1 | 9/2014 |

OTHER PUBLICATIONS

Pesetskii et al; "Blends of polycarbonate and polysulphone-polydimethyl-siloxane block copolymer: analysis of compatibility and impact strength"; Journal of Applied Polymer Science; vol. 73, No. 10; 1999; pp. 1823-1834.

Schmitt et al; "Study of surface composition and morphology of block copolymers of bisphenol A polycarbonate and poly(dimethylsiloxane) by x-ray photoelectron spectroscopy and ion scattering spectroscopy"; Macromolecules; vol. 18 No. 12; 1985; 5 pages.

Van Aert et al, "Poly(bisphenol A carbonate)-poly(dimethylsiloxane) multiblock copolymers"; Polymer; vol. 42, No. 5; 2001; pp. 1781-1788.

Ward et al; "Inverse gas chromatography studies of poly(dimethylsiloxane)-polycarbonate copolymers and blends"; Macromolecules; vol. 14, No. 6; 1981; pp. 1791-1797.

Yang et al; "Quantitative Morphology Characterization of New PC-siloxane Copolymer Blends"; Microscopy Society of America; vol. 20, No. 3; 2014; pp. 1934-1935.

Zhou et al; "Siloxane modification of polycarbonate for superior flow and impact toughness"; Polymer; vol. 51, No. 9; 2010; pp. 1990-1999.

Groote et al., U.S. Appl. No. 14/943,651, titled "Polycarbonate-Polysiloxane Copolymer Compositions, Articles Formed Therefrom, and Methods of Manufacture Thereof", filed with the USPTO on Nov. 17, 2015.

Groote et al., U.S. Appl. No. 14/943,681, tilted "Polycarbonate-Polysiloxane Copolymer Compositions for Mobile Phone Housing Applications", filed with the USPTO on Nov. 17, 2015.

JP H1046022; Published Feb. 17, 1998; English Abstract Only; 1 page.

KR 2013077772 A; Published Jul. 9, 2013; English Abstract Only; 1 page.

International Search Report for International Application No. PCT/US2016/062218, International Filing Date Nov. 16, 2016, Date of Mailing Jan. 30, 2017, 6 pages.

Written Opinion for International Application No. PCT/US2016/062218, International Filing Date Nov. 16, 2016, Date of Mailing Jan. 30, 2017, 7 pages.

* cited by examiner

POLYCARBONATE-POLYSILOXANE COPOLYMER COMPOSITIONS, ARTICLES FORMED THEREFROM, AND METHODS OF MANUFACTURE THEREOF

BACKGROUND

This disclosure relates to polycarbonate compositions, articles formed therefrom, and their methods of manufacture, and in particular to polycarbonate-polysiloxane copolymer compositions with advantageous properties such as improved aesthetic properties, good impact, or desirable chemical resistance.

Polycarbonate homopolymers and polycarbonate copolymers are useful in a wide variety of applications at least in part because of their good balance of properties, such as moldability, heat resistance and impact properties, among others. Despite extensive research on these materials over the years, there still remains a need in the art for improved polycarbonate compositions that meet increasingly stringent industry standards.

For example, polycarbonate-polysiloxane copolymers can have good mechanical properties and low temperature impact resistance. However, blends of a polycarbonate homopolymer with such a polycarbonate-polysiloxane can result in poor aesthetics of molded parts. Aesthetic defects can include excess haze, limited color space capability, pearlescence, or other surface defects related to molding such as streaks and flow lines. To improve the aesthetics, other desirable properties such as low temperature impact and chemical resistance may be comprised. There accordingly remains a need in the art for polycarbonate compositions that can have balanced aesthetics, low temperature impact, and chemical resistance.

SUMMARY

A polycarbonate composition comprises: a first poly(carbonate-siloxane) copolymer comprising carbonate units and siloxane units, wherein less than 0.5 mol % of the siloxane units are directly coupled to another siloxane unit; the first poly(carbonate-siloxane) copolymer comprising siloxane units with an average block length of about 10 to about 100, and a siloxane content from 5 wt % to 8 wt % based on the total weight of the first poly(carbonate-siloxane) copolymer; a second poly(carbonate-siloxane) copolymer comprising carbonate units and siloxane units, wherein less than 0.5 mol % of the siloxane units are directly coupled to another siloxane unit; the second poly(carbonate-siloxane) copolymer comprising siloxane units with an average block length of 10 to 100, a siloxane content from 10 wt % to 30 wt % based on the total weight of the second poly(carbonate-siloxane) copolymer, and wherein the weight ratio of the first poly(carbonate-siloxane) copolymer to the second poly(carbonate-siloxane) copolymer is 2 to 20; and optionally a bisphenol polycarbonate different from the first poly(carbonate-siloxane) copolymer and the second poly(carbonate-siloxane) copolymer; wherein the polycarbonate composition has a total siloxane content of 2.5 wt % to 10 wt % based on the total weight of the composition and a molded part of 1 mm thickness has a haze of less than 2% as measured by HazeGard (ASTM D1003-00).

In another embodiment, an article selected from a molded article, a thermoformed article, an extruded film, an extruded sheet, a honeycomb structure, one or more layers of a multi-layer article, a substrate for a coated article, and a substrate for a metallized article comprises the above-described polycarbonate composition.

In yet another embodiment, a method of manufacture of an article comprises molding, extruding, casting, or shaping the above-described polycarbonate composition into an article.

The above described and other features are exemplified by the following Drawings, Detailed Description, and Examples.

DETAILED DESCRIPTION

The inventors hereof have discovered that polycarbonate compositions having a balanced impact, chemical resistance, and aesthetic properties can be obtained by combining at least two poly(carbonate-siloxane) copolymers and an optional bisphenol polycarbonate different from the first and second poly(carbonate-siloxane) copolymers, wherein the first poly(carbonate-siloxane) copolymer has a siloxane content of 5 wt % to 8 wt % based on the total weight of the first poly(carbonate-siloxane) copolymer, and the second poly(carbonate-siloxane) copolymer has a siloxane content of 10 wt % to 30 wt % based on the total weight of the second poly(carbonate-siloxane) copolymer; and further wherein in both the first and second poly(carbonate-siloxane) copolymers, less than 0.5 mol % of the siloxane units are directly coupled to another siloxane unit. Compared to the sample of a reference composition containing the same first poly(carbonate-siloxane) copolymer but a second poly(carbonate-siloxane) copolymer having greater than 10 mol % of siloxane units directly coupled to another siloxane unit, at the same total siloxane loading level, a sample of the compositions of the disclosure has reduced haziness, which is typically indicating a reduction in aesthetic defects, such as black streaking, knitline visibility, gate blush, or pearlescence. The compositions of the disclosure also have similar or improved impact and chemical resistance compared to the reference composition.

The individual components of the compositions are described in more detail below.

The polycarbonate compositions comprise at least two polycarbonate-polysiloxane copolymers, also referred to as a poly(carbonate-siloxane)s. The poly(carbonate-siloxane)s comprise carbonate units and siloxane units. The carbonate units are bisphenol carbonate units of the formula (2)

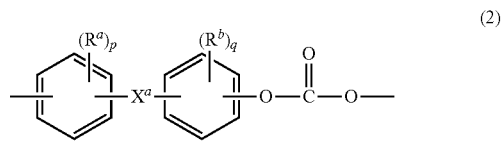

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)_2—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group The carbonate units can be derived from a dihydroxy compound such as a bisphenol of formula (3).

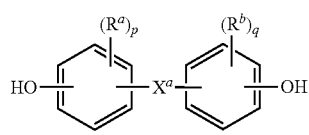

(3)

In formula (3), $R^a$, $R^b$, $X^a$, p, and q are the same as those defined in the context of formula (2).

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

The siloxane units (also referred to as polysiloxane blocks) are of formula (4)

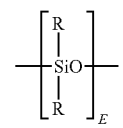

(4)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polycarbonate-polysiloxane is desired, R is unsubstituted by halogen. Combinations of the foregoing R groups can be used in the same copolymer.

The value of E in formula (4) can vary widely depending on the type and relative amount of each component in the polycarbonate composition, the desired properties of the composition, and like considerations. Generally, E has an average value of 10 to 100, preferably 20 to 60, more preferably 30 to 50.

In an embodiment, the siloxane units are of formula (5)

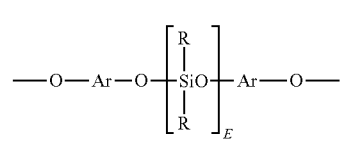

(5)

wherein E is as defined above in the context of formula (4); each R can be the same or different, and is as defined above in the context of formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

Specific examples of siloxane units of formula (5) include those of the formulas (5a) and (5b):

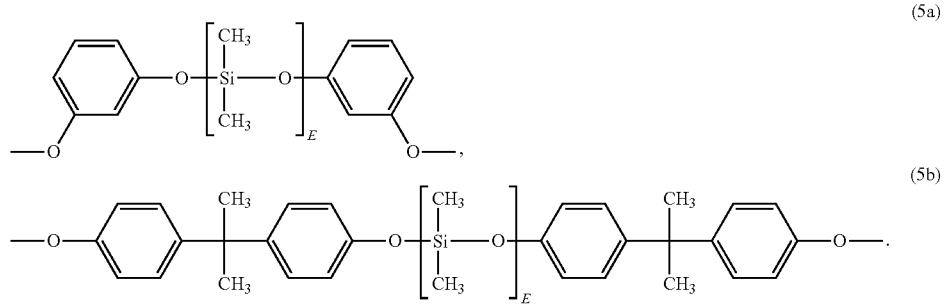

In another embodiment, the siloxane units are of formula (6)

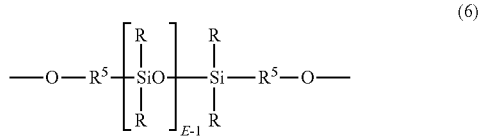

wherein R and E are as described above in the context of formula (4), and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (7):

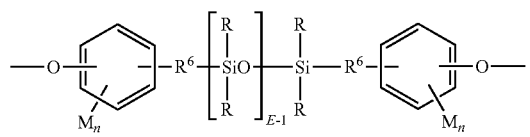

wherein R and E are as defined above in the context of formula (4). $R^6$ in formula (7) is a divalent $C_2$-$C_8$ aliphatic. Each M in formula (7) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, $R^6$ is a divalent $C_1$-$C_3$ aliphatic group. Specific polydiorganosiloxane blocks are of the formula

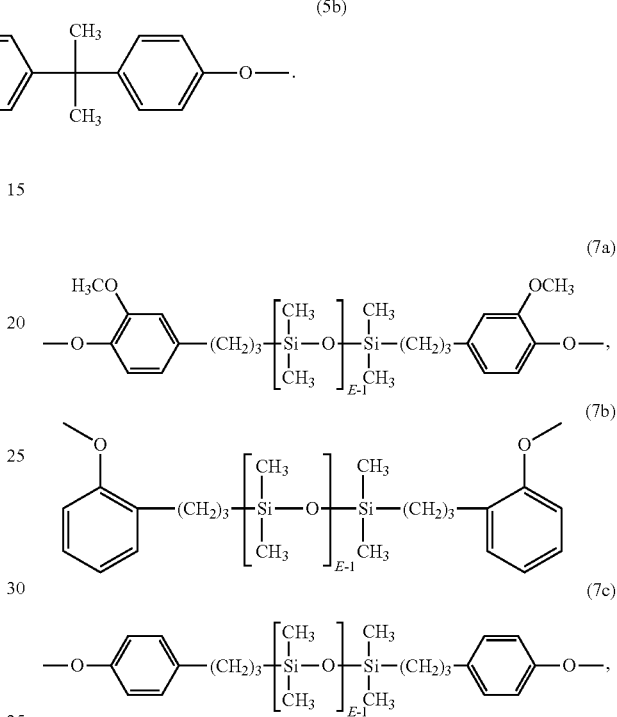

or a combination comprising at least one of the foregoing, wherein E has an average value of 10 to 100, preferably 20 to 60, more preferably 30 to 50, or 40 to 50.

Blocks of formula (7) can be derived from the corresponding dihydroxy polydiorganosiloxane of formula (8),

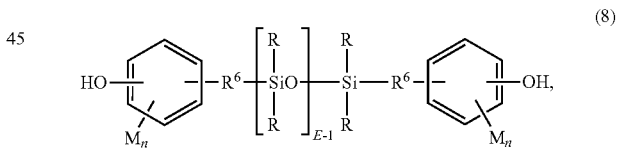

which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol.

The polycarbonate-polysiloxane copolymers can then be manufactured using one or more of the tube reactor processes described in U.S. Patent Application Publication No. 2004/0039145, or the process described in U.S. Pat. No. 6,723,864, or the process described in U.S. Pat. No. 8,466,249.

In an embodiment, the polycarbonate-polysiloxane copolymers comprise carbonate units derived from bisphenol A, and repeating siloxane units (5a), (5b), (7a), (7b), (7c), or a combination comprising at least one of the foregoing (specifically of formula 7a), wherein E has an average value of E has an average value of 10 to 100, preferably 20 to 60, more preferably 30 to 50 or 40 to 50.

The first polycarbonate-polysiloxane copolymer has a siloxane content of 5 wt % to 8 wt %, specifically 5 wt % to 7 wt %, based on the total weight of the first polycarbonate-polysiloxane copolymer. As used herein, "siloxane content" of a poly(carbonate-siloxane) copolymer refers to the content of siloxane units based on the total weight of the polysiloxane-polycarbonate copolymer. The first polyorganosiloxane-polycarbonate copolymer can have a weight average molecular weight of 18,000 to 25,000 Daltons, specifically 20,000 to 22,000 Daltons as measured by gel permeation chromatography using a crosslinked styrene-divinyl benzene column, at a sample concentration of 1 milligram per milliliter, and as calibrated with polycarbonate standards.

Generally, a polycarbonate-polysiloxane block copolymer can be considered as being formed from a bisphenol of Formula (3) and a dihydroxy polydiorganosiloxane of formula (8), with carbonate linkages between these monomers. There are potentially three types of linkages between the carbonate blocks (C) and siloxane blocks (S). Illustratively these linkages are C—C, S—S, and C—S. In an embodiment, in the first polysiloxane-polycarbonate, less than 0.5 mol % of the siloxane units are directly coupled to another siloxane units, specifically less than 0.2 mol % of the siloxane units are directly coupled to another siloxane units, more specifically less than 0.1 mol % of the siloxane units are directly coupled to another siloxane units.

The second polycarbonate-polysiloxane copolymer has a siloxane content of 10 wt % to 30 wt %, specifically 15 wt % to 25 wt %, more specifically 18 to 22, each based on the total weight of the second polycarbonate-polysiloxane copolymer. The second polyorganosiloxane-polycarbonate copolymer can have a weight average molecular weight of 18,000 to 25,000 Daltons, specifically 20,000 to 22,000 Daltons as measured by gel permeation chromatography using a crosslinked styrene-divinyl benzene column, at a sample concentration of 1 milligram per milliliter, and as calibrated with polycarbonate standards.

The inventors hereof have found that the in order to provide a polycarbonate composition having balanced impact, chemical resistance, and aesthetics, the type of linkages between the carbonate units and the siloxane units in the second polycarbonate-polysiloxane copolymers should be controlled. In the second polysiloxane-polycarbonate, less than 0.5 mol % of the siloxane units are directly coupled to another siloxane units, specifically less than 0.2 mol % of the siloxane units are directly coupled to another siloxane units, more specifically less than 0.1 mol % of the siloxane units are directly coupled to another siloxane units.

In an embodiment, the weight ratio of the first polycarbonate-polysiloxane copolymer to the second polycarbonate-polysiloxane copolymer is 2 to 20, specifically 2 to 15, more specifically 5 to 15. The polycarbonate compositions can have a total siloxane content of 2.5 wt % to 10 wt %, specifically 3 wt % to 9 wt %, more specifically 3.5 wt % to 8.5 wt %, each based on the total weight of the polycarbonate compositions.

The polycarbonate compositions can also comprise a bisphenol polycarbonate different from the first poly(carbonate-siloxane) copolymer and the second poly(carbonate-siloxane) copolymer. The bisphenol polycarbonate comprises carbonate units of formula (2). Preferably the bisphenol polycarbonate is a bisphenol A polycarbonate homopolymer, also referred to as bisphenol A homopolycarbonate, which has repeating structural carbonate units of the formula (1)

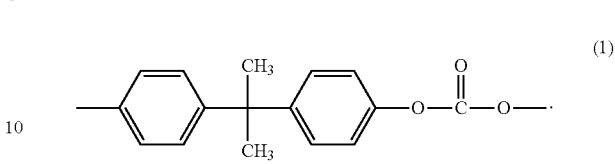

Polycarbonate can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloro formate, and toluene chloro formate. Phenol and para-cumylphenol are specifically mentioned. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

In an embodiment, the bisphenol polycarbonate is a linear bisphenol A polycarbonate homopolymer having a weight average molecular weight of 10,000 to 100,000 Daltons, specifically 15,000 to 50,000 Daltons, more specifically 17,000 to 35,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

More than one bisphenol A polycarbonate homopolymer can be present. For example, the polycarbonate compositions can comprise a first bisphenol A polycarbonate homopolymer having a weight average molecular weight of 20,000 Daltons to 25,000 Daltons or 20,000 Daltons to 23,000 Daltons or 20,000 Daltons to 22,000 Daltons as measured by GPC using BPA polycarbonate standards and a second bisphenol A polycarbonate homopolymer having a weight average molecular weight of 28,000 to 32,000 Daltons, or a second bisphenol A polycarbonate homopolymer having a weight average molecular weight of 16,000 Daltons to 19,000 Daltons, each measured by GPC using BPA polycarbonate standards. The weight ratio of the first bisphenol A polycarbonate homopolymer relative to the second bisphenol A polycarbonate homopolymer is 10:1 to 1:10, specifically 5:1 to 1:5, more specifically 3:1 to 1:3 or 2:1 to 1:2. In an embodiment, the polycarbonate composition comprises 0 wt % to 69 wt % or 15 wt % to 62 wt % of one or more bisphenol polycarbonates different from the first and second poly(carbonate-siloxane).

In addition to the first and second poly(carbonate-siloxane)s and the bisphenol polycarbonate different from the first and second poly(carbonate-siloxane), the polycarbonate composition can optionally include various additives ordinarily incorporated into polymer compositions of this type, with the proviso that the additive(s) are selected so as to not significantly adversely affect the desired properties of the polycarbonate composition, in particular impact, chemical resistance, and aesthetics. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the polycarbonate composition. In an embodiment, the polycarbonate composition comprises no more than 5 wt. % based on the weight of the composition of a processing aid, a heat stabilizer, an antioxidant, an ultra violet light absorber, or a combination comprising at least one of the foregoing.

The polycarbonate compositions can optionally include a colorant composition containing pigment and/or dye additives. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The composition can have any suitable color including white, gray, light gray, black, and the like. The white or light gray color can exhibit an L* value greater than or equal to 80. A composition having a white or light gray color can comprise an amount of titanium dioxide in amounts of 0.1 to 30 wt. %, 0.1 to 25 wt. %, 0.1 to 20 wt. %, or 0.1 to 15 wt. %, each based on the total weight of the polycarbonate composition.

The gray or black color can exhibit an L* value of below 80. A composition having a gray or black color can comprise an amount of carbon black of greater than zero and less than 1.5 wt. % based on the total weight of the colorant composition. In an embodiment, a molded sample having a thickness of 1 mm formed from the composition has an average L* value of 29 or less as measure by the CIE Lab method, 10 degree observer, D65 illuminant, specular component included, measured in reflectance mode.

The polycarbonate compositions may optionally include flame retardants. Various types of flame retardants can be utilized. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein.

The polycarbonate compositions may optionally comprise anti-drip agents. The anti-drip agent may be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

The polycarbonate compositions can optionally further comprise a filler composition. The filler composition is present in an amount of 1 wt % to 20 wt % or 1 to 15 wt % based on the total weight of the polycarbonate composition. In an embodiment, the filler composition comprises titanium dioxide.

The polycarbonate compositions have excellent aesthetic properties. A molded article of the composition with a thickness of 1 mm can have less than 10% or less than 5%, measured by HazeGard (ASTM D1003-00). A molded article of the composition with a thickness of 3 mm can have less than 50% or less than 10%, measured by HazeGard (ASTM D1003-00).

The polycarbonate compositions can further have good impact properties. The compositions have an Izod notched impact energy of at least 700 J/m measured at +23° C. on a sample of 3.2 mm thickness according to ASTM D256-10.

The polycarbonate compositions can have a ductile/brittle transition temperature of less than or equal to −10° C. determined in accordance with ASTM D256-2010 on a molded part having a thickness of 3.2 mm.

The polycarbonate compositions can have good chemical resistance. The compositions have a tensile yield strength retention of 80% and higher after exposure of an ISO tensile bar for 24 hours to sunscreen under 0.5% strain compared to a non-exposed reference tested according to ISO 22088-3; and an elongation at break retention of 75% and higher after exposure of an ISO tensile bar for 24 hours to sunscreen under 0.5% strain compared to a non-exposed reference tested according to ISO 22088-3.

The polycarbonate compositions can further have good melt viscosities, which aid processing. The polycarbonate compositions have a melt volume flow rate (MVR, cubic centimeter per 10 minutes (cc/10 min) of 4 to 30, greater than or equal to 5, greater than or equal to 8, greater than or equal to 10, greater than or equal to 12, greater than or equal to 14, greater than or equal to 16, greater than or equal to 18, or greater than or equal to 20, determined in accordance with ASTM D1238 under a load of 1.2 kg at 300° C. The same or similar values can be obtained in articles having a wide range of thicknesses, for example from 0.1 to 10 mm, or 0.5 to 5 mm.

In an embodiment, a polycarbonate composition comprises: a first poly(carbonate-siloxane) copolymer comprising carbonate units and siloxane units, wherein less than 0.5 mol % of the siloxane units are directly coupled to another siloxane unit; the first poly(carbonate-siloxane) copolymer comprising siloxane units with an average block length of about 10 to about 100, and a siloxane content from 5 wt % to 8 wt % based on the total weight of the first poly(carbonate-siloxane) copolymer; a second poly(carbonate-siloxane) copolymer comprising carbonate units and siloxane units, wherein less than 0.5 mol % of the siloxane units are directly coupled to another siloxane unit; the second poly(carbonate-siloxane) copolymer comprising siloxane units with an average block length of 10 to 100, a siloxane content from 10 wt % to 30 wt % based on the total weight of the second poly(carbonate-siloxane) copolymer, and wherein the weight ratio of the first poly(carbonate-siloxane) copolymer to the second poly(carbonate-siloxane) copolymer is 2 to 20; and optionally a bisphenol polycarbonate different from the first poly(carbonate-siloxane) copolymer and the second poly(carbonate-siloxane) copolymer; wherein the polycarbonate composition has a total siloxane content of 2.5 wt % to 10 wt % based on the total weight of the composition and a molded part of 1 mm thickness has a haze of less than 2% as measured by HazeGard (ASTM D1003-00).

An exemplary polycarbonate composition comprises, based on the total weight of the composition, 30 wt % to 95 wt % of the first poly(carbonate-siloxane) copolymer; 1 wt % to 20 wt % of the second poly(carbonate-siloxane) copolymer; and 0 wt % to 69 wt % of the bisphenol polycarbonate comprising a bisphenol A homopolycarbonate.

Another exemplary polycarbonate composition comprises, based on the total weight of the composition, 35 wt % to 75 wt % of the first poly(carbonate-siloxane) copolymer; 3 wt % to 15 wt % of the second poly(carbonate-siloxane) copolymer; and 15 wt. % to 62 wt. % of the bisphenol polycarbonate comprising a bisphenol A homopolycarbonate.

The polycarbonate compositions can be manufactured by various methods known in the art. For example, powdered polycarbonate homopolymer, polycarbonate-polysiloxane copolymer and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate compositions are also provided. The polycarbonate compositions can be molded into useful shaped articles by a variety of methods, such as injection molding, extrusion, rotational molding, blow molding and thermoforming. The article can be a molded article, a thermoformed article, an extruded film, an extruded sheet, a honeycomb structure, one or more layers of a multi-layer article, a substrate for a coated article, and a substrate for a metallized article.

The article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar.

The article is an electronic housing for an adapter, a cell phone, a smart phone, a GPS device, a laptop computer, a tablet computer, an e-reader, a copier, or a solar apparatus.

The article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

The above described and other features are exemplified by the following detailed description and Examples. In the examples, unless otherwise specified, the percent (%) of the components as well as the percent (%) of siloxane are weight percent based on the sum of the weights of the bisphenol A linear polycarbonate homopolymer and the (polydimethylsiloxane)-bisphenol A polycarbonate copolymer.

EXAMPLES

Materials

The polycarbonates and polycarbonate copolymers used in the Examples are described in Table 1.

In Table 1, a reference to D45 means a dimethylsiloxane block having an average number of siloxane units of 45+/−5. The "Tube" copolymers were manufactured using one or more of the tube reactor processes described in U.S. Patent Application Publication No. 2004/0039145, or the process described in U.S. Pat. No. 6,723,864, or the process described in U.S. Pat. No. 8,466,249. The "Upfront" copolymers were manufactured by introducing phosgene under interfacial reaction conditions into a mixture of bisphenol A and a eugenol terminated polydimethylsiloxane. The EE/EB ratio refers to the molar ratio of the polydimethylsiloxane subunits directly coupled to another polydimethylsiloxane submit (EE) relative to the polydiorganosiloxane subunits directly coupled to BPA subunit (EB) for the PDMS-BPA polycarbonate copolymer. The EE/EB ratio was determined via nuclear magnetic resonance (NMR) spectroscopy.

The weight average molecular weights (Mw) in Table 1 were measured by gel permeation chromatography using polycarbonate standards. The percent of siloxane is weight percent based on the weight of the copolymer.

TABLE 1

| Component | Chemical Description | Source, Vendor |
|---|---|---|
| PC1 | Linear Bisphenol A Polycarbonate homopolymer, produced via interfacial polymerization, Mw of about 21,800 g/mol as determined by GPC using polycarbonate standards, para- cumylphenol (PCP) end-capped | SABIC |
| PC2 | Linear Bisphenol A Polycarbonate homopolymer, produced via interfacial polymerization, Mw of about 30,500 g/mol as determined by GPC using polycarbonate standards, phenol end-capped | SABIC |
| SiPC3 | PDMS (polydimethylsiloxane) - Bisphenol A Polycarbonate copolymer, produced via interfacial polymerization, 20 wt. % siloxane, average PDMS block length of 45 units (D45), Mw about 30,000 g/mol as determined by GPC using polycarbonate standards, para-cumylphenol (PCP) end-capped, EE/EB ratio of 38/62 | SABIC |
| SiPC4 | PDMS (polydimethylsiloxane) - Bisphenol A Polycarbonate copolymer, produced via interfacial polymerization, 20 wt. % siloxane, average PDMS block length of 45 units (D45), Mw about 30,000 g/mol as determined by GPC using polycarbonate standards, para-cumylphenol (PCP) end-capped, EE/EB ratio of 0/100 | SABIC |
| SiPC5 | PDMS (polydimethylsiloxane) - Bisphenol A Polycarbonate copolymer, produced via interfacial polymerization, 6 wt. % siloxane, average PDMS block length of 45 units (D45), Mw about 23,000 g/mol as determined by GPC using polycarbonate standards, para-cumylphenol (PCP) end-capped, EE/EB ratio of 0/100 | SABIC |
| I-168 | Tris(2,4-ditert-butylphenyl)phosphite (Irgafos 168) | Ciba |

The additive composition that was used in the Examples contains 0.03 to 0.06% of I-168 as heat stabilizer.

Extrusion and Molding Conditions.

The compositions were prepared by pre-blending all constituents in a dry-blend and tumble mixed for 15 minutes. The pre-blend was fed directly to a co-rotation twin screw extruder under the conditions shown in Table 2. The extrudate was pelletized and dried in a dehumidifying dryer at about 120° C. for about 3 hours. To make test specimens, the dried pellets were injection molded in an ENGEL molding machine to form appropriate test samples under the conditions shown in Table 2.

TABLE 2

| Compounding Machine: Werner-Pfleiderer ZSK twin-screw extruder (25 mm) | | | Injection Molding Machine: Engel E45, E75, or E90 | | |
|---|---|---|---|---|---|
| Feed (zone 0) Temperature | ° C. | 40 | Pre-dry Time | h | 2 |
| Zone 1 Temperature | ° C. | 200 | Pre-dry Temperature | ° C. | 120 |
| Zone 2 Temperature | ° C. | 250 | Hopper Temperature | ° C. | 40 |
| Zone 3 Temperature | ° C. | 270 | Zone 1 Temperature | ° C. | 280 |
| Zones 4-9 Temperature | ° C. | 285 | Zone 2 Temperature | ° C. | 290 |
| Screw Speed | rpm | 300 | Zone 3 Temperature | ° C. | 300 |
| Throughput | kg/h | 18-24 | Nozzle Temperature | ° C. | 295 |
| Torque | % | 50-70 | Mold Temperature | ° C. | 90 |
| Vacuum 1 | bar | 0.7 | Cycle Time | s | ±37 |

Testing Methods.

Tensile properties were measured in accordance to ISO 527 at 50 mm/min at room temperature on standard ISO tensile bars.

Notched Izod impact Strength ('INI') was determined in accordance with ASTM D256-10 under a load of 5 lbf at various temperatures including 23° C., −30° C. or −50° C. All INI determinations were carried out on sample plaques of 3.2 mm thickness.

Melt volume rate ("MVR") was determined in accordance with ASTM D1238 under a load of 1.2 kg at 300° C.

Haze measurement by HazeGard (ASTM D1003-00) used injected molded samples of 1 mm or 3 mm thickness.

Environmental Stress Cracking Resistance ("ESCR") describes the accelerated failure of polymeric materials, as a combined effect of environment, temperature, and stress. The failure mainly depends on the characteristics of the material, chemical, exposure condition, and the magnitude of the stress. The tests followed ISO 22088-3 standard and used ISO tensile bars under 0.5% or 1% strain for 24 hours at room temperature with chemical (BANANABOAT sunscreen) applied on the surface. After 24 hours, the retention of tensile strength and elongation to break, measured according to ISO 527, compared to the non-exposed reference.

Examples 1-2 and Comparative Examples 3-6

Exemplary compositions of the present disclosure (E1-2), along with control or comparative compositions (CE3-6) are shown in Tables 3. The flow, impact, and haze properties were assessed for each sample, and the results are summarized in Tables 3.

TABLE 3

|  | CE3 | CE4 | CE5 | CE6 | E1 | E2 |
|---|---|---|---|---|---|---|
| PC1 | 12.5 | 37.5 | 68.7 |  | 31.6 | 8.7 |
| PC2 |  |  |  | 37.5 | 26.4 | 7.3 |
| SiPC5 | 75.0 | 53.6 | 26.8 |  | 35.0 | 74.0 |
| SiPC4 |  |  |  |  | 7.0 | 14.0 |
| SiPC3 | 12.5 | 8.9 | 4.5 | 17.5 |  |  |
| Additives | 0.03 | 0.03 | 0.03 | 0.03 | 0.03 | 0.03 |
| Total | 100 | 100 | 100 | 100 | 100 | 100 |
| Si content | 7.0 | 5.0 | 2.5 | 3.5 | 3.5 | 7.0 |
| Ratio* | 6 | 6 | 6 | — | 5 | 5 |
| Properties |  |  |  |  |  |  |
| MVR (cm³/10 min) | 8.4 | 11.8 | 18.1 | 9.7 | 10.9 | 8.3 |
| INI @ 23° C. (J/m) | 651 | 750 | 704 | 837 | 830 | 804 |
| Ductility (%) | 100 | 100 | 100 | 100 | 100 | 100 |
| INI @ −30° C. (J/m) | 621 | 655 | 615 | 759 | 603 | 597 |
| Ductility (%) | 100 | 100 | 100 | 100 | 100 | 100 |
| Haze @ 1 mm (%) | 13.2 | 14.8 | 11.9 | 67 | 1.0 | 0.6 |
| Haze @ 3 mm (%) | 94.7 | 95.6 | 87.3 | 100 | 4.7 | 2.3 |

*Ratio refers to weight ratio of SiPC5 relative to a different second SiPC

Comparative Example 6 is a blend of polycarbonate and SiPC3. Although the composition has good impact with INI at 23° C. higher than 800 J/m, this composition has poor aesthetics with very high haze values at both 1 mm (67%) and at 3 mm (100%). Comparative Examples 3, 4 and 5 show compositions containing polycarbonate PC1 with a first SiPC (SiPC5) and a second SiPC (SiPC3) having different siloxane loadings (7, 5 and 2.5% respectively). The weight ratios of SiPC5 to SiPC3 in the compositions of Comparative Examples 3-5 are 6. These compositions have relatively high haze values at both 1 mm (above 10%) and 3 mm (above 85%), but significantly improved, especially at 1 mm thickness, compared to CEx8, which only contains SiPC3. SiPC5 acts as a compatibilizer for SiPC3 to improve compatibility of SiPC3 with PC and to improve the dispersion and particle size of the siloxane domains in the PC matrix, but a ratio of SiPC5 to SiPC3 of 6 is not high enough to achieve good aesthetic properties. US 20140357781 discloses that when the ratio of SiPC5 to SiPC3 is greater than 8, aesthetics can be improved.

The compositions of the disclosure in Examples 1 to 2 are based on blends of polycarbonate (PC1 and PC2) with SiPC5 and a different second SiPC type, namely SiPC4 at SiPC5 to second SiPC type ratio of 5, and siloxane loadings of 3.5 and 7%. Both SiPC3 and SiPC4 containing 20 wt % siloxane, but are made via a different process, resulting in significantly different EE/EB ratios. SiPC4 has an EE/EB ratio of 0/100, whereas SiPC3 has an EE/EB ratio of 38/62. These compositions have similar flow properties (MVR in range of 8 to 11) as the comparative examples CE3 and CE4, and have good impact properties with ductile ASTM INI at −30° C. In addition, the compositions of Examples 1 to 2 have, despite a lower ratio of SiPC5 to second SiPC (SiPC4) of 5, compared to compositions containing SiPC5 and SiPC3 (CE3, CE4 and CE5 with a ratio of 6), excellent aesthetics with very low haze values below 1% at 1 mm compared to above 10% for CE3-5. As such, these compositions of Examples 1-2 containing novel combinations of two SiPC types with specific compositions offer a better balance of impact and aesthetics vs blends of SiPC5 and SiPC3.

The results indicate that replacing SiPC3 in blends containing PC, SiPC5 and SiPC3 (20% siloxane, prepared via an upfront process) with SiPC copolymers with similar siloxane loading as SiPC3 but produced via a tubular process (SiPC4) and low EE/EB ratio of 0/100 instead of high EE/EB ratio for SiPC3 (38/62) provides formulations having balanced properties compared to blends of PC with SiPC5 and SiPC3 at SiPC3/second SiPC weight ratios of 5 (which is not sufficient for SiPC3 and SiPC5 blends to achieve good aesthetics). SiPC4 acts as compatibilizer and further improves aesthetics of the composition containing both SiPC5 and SiPC4.

Examples 7-10 and Comparative Examples 11-12

Examples 7-10 illustrate the impact and aesthetic properties of compositions containing SiPC5 and a second SiPC namely SiPC4, wherein the weight ratios of SiPC5 relative to the second SiPC are equal to or greater than 10, and an optional PC. The second SiPC in Comparative Example 11 is SiPC3. The results are shown in Table 4.

TABLE 4

|  | CE11 | CE12 | E7 | E8 |
|---|---|---|---|---|
| PC1 | 3.7 | 16.6 | 22.31 |  |
| PC2 |  |  |  | 26.76 |
| SiPC5 | 87.5 | 83.4 | 47.7 | 93.7 |
| SiPC3 | 8.7 |  |  |  |
| SiPC4 |  |  | 3.2 | 6.3 |
| Additives | 0.03 | 0.03 | 0.03 | 0.03 |
| Total | 100 | 100 | 100 | 100 |
| Si content | 7.0 | 5.0 | 3.5 | 7.0 |
| Ratio | 10 | — | 15 | 15 |
| MVR (cm3/10 min) | 7.8 | 11.2 | 11.1 | 8.4 |
| INI @ 23° C. (J/m) | 660 | 725 | 840 | 685 |
| Ductility (%) | 100 | 100 | 100 | 100 |
| INT @ −30° C. (J/m) | 624 | 594 | 597 | 530 |
| Ductility (%) | 100 | 100 | 100 | 100 |
| Haze @ 1 mm (%) | 4.8 | 0.5 | 0.6 | 0.5 |
| Haze @ 3 mm (%) | 55.2 | 1.6 | 2.0 | 1.4 |

Comparative Example 11 shows that a composition containing polycarbonate (PC1), a first SiPC (SiP5) and a second SiPC (SiPC3) with higher ratios of SiPC5 to SiPC3 of 10 has improved aesthetics. Compared to the previous set of comparative examples CE 3-5 in Table 3, the composition of CE11 has relatively low haze values at 1 mm (<5%) but still relatively high haze at 3 mm (above 50%). As such, despite the more efficient compatibilization by SiPC5 at ratio of 10 compared to a ratio of 6 (CE3 to 5), such compositions do not have aesthetics close to blends of polycarbonate and SiPC5 without SiPC3 (Comparative Example 12), which has much better haze with haze values below 1% at 1 mm and below 2% at 3 mm.

The compositions of Example 7-8 are based on blends of SiPC5 and a different second SiPC type, namely SiPC4, and optionally polycarbonate (PC1 and PC2) at SiPC5 to second SiPC type ratios of 15, and siloxane loadings of 3.5 or 7. These compositions have similar flow properties (MVR in range of 8 to 11) as the comparative examples CE11 and CE12, and have good impact properties with ductile ASTM INI at −30° C. In addition, all these compositions, have significantly improved aesthetics compared to CE11, with very low haze values below 2% at 1 mm (compared to 5% for CE11), and below 10% at 3 mm (compared to >50% for CE11). As such, these compositions containing novel combinations of two SiPC types with specific compositions offer better balance of impact and aesthetics vs blends of SiPC5 and SiPC3, and approach the excellent aesthetic properties of compositions containing only SiPC5 and PC (CE12).

The formulations of Examples 1-2 (at SiPC5 to second SiPC ratios of 5) offer better aesthetics compared to CE3-5 (SiPC5/SiPC3 blends at a ratio of 6). These aesthetics can be further improved by increasing the ratio of SiPC5 to second SiPC to a value above 10. In this case aesthetics close to those of CE 12 are obtained.

The advantage of using SiPC5/SiPC4 blends with PC like Examples 7-8 over blends of PC with only SiPC5 (CE×12) becomes clear when evaluating chemical resistance of the samples according to the ESCR method as described herein. The results of ESCR testing on Examples 7-10 and CE×12 are shown in Table 5. Blends of PC with only SiPC5 (CE×12) have relatively poor chemical resistance to sunscreen and have <60% retention of tensile strength (TS %) and elongation to break (NS@B %) after exposure to sunscreen for 1 day under 0.5% strain. Blends of PC with SiPC5 and SiPC4 (E8, E9 and E10) offer better chemical resistance than blends with only SiPC5 (CE×12), and have good retention of tensile strength (TS %) (>100%) and elongation to break (NS@B %) (>65%) after exposure to sunscreen for 1 day under 0.5% strain. Hence, the addition of a second SiPC component to blends of PC and SiPC5 offers an optimized balance of chemical resistance and aesthetics in PC/SiPC blends.

TABLE 5

| | CE12 | E7 | E8 | E9 | E10 |
|---|---|---|---|---|---|
| PC1 | 16.6 | 22.31 | | | |
| PC2 | | 26.76 | | | |
| SiPC5 | 83.4 | 47.7 | 93.7 | 90 | 82.5 |
| SiPC3 | | | | | |
| SiPC4 | | 3.2 | 6.3 | 10 | 17.5 |
| Additives | 0.03 | 0.03 | 0.03 | 0.03 | 0.03 |
| Total | 100 | 100 | 100 | 100 | 100 |
| Si content | 5.0 | 3.5 | 7.0 | 7.4 | 8.5 |
| Ratio | — | 15 | 15 | 9 | 4.7 |
| MVR (cm3/10 min) | 11.2 | 11.1 | 8.4 | 6 | 5 |
| Bananaboat 0.5% - 1 Day - TS% | 60 | N/D | 101 | 101 | 101 |
| Bananaboat 0.5% - 1 Day - NS@B% | 57 | N/D | 78 | 78 | 65 |

Further included in this disclosure are the following specific embodiments, which do not necessarily limit the claims.

Embodiment 1

A polycarbonate composition comprising:
a first poly(carbonate-siloxane) copolymer comprising carbonate units and siloxane units, wherein less than 0.5 mol % of the siloxane units are directly coupled to another siloxane unit;
the first poly(carbonate-siloxane) copolymer comprising siloxane units with an average block length of about 10 to about 100, and
a siloxane content from 5 wt % to 8 wt % based on the total weight of the first poly(carbonate-siloxane) copolymer;
a second poly(carbonate-siloxane) copolymer comprising carbonate units and siloxane units, wherein less than 0.5 mol % of the siloxane units are directly coupled to another siloxane unit;
the second poly(carbonate-siloxane) copolymer comprising
siloxane units with an average block length of 10 to 100,
a siloxane content from 10 wt % to 30 wt % based on the total weight of the second poly(carbonate-siloxane) copolymer, and
wherein the weight ratio of the first poly(carbonate-siloxane) copolymer to the second poly(carbonate-siloxane) copolymer is 2 to 20; and
optionally a bisphenol polycarbonate different from the first poly(carbonate-siloxane) copolymer and the second poly(carbonate-siloxane) copolymer;
wherein the polycarbonate composition has a total siloxane content of 2.5 wt % to 10 wt % based on the total weight of the composition and
a molded part of the composition with a 1 mm thickness has a haze of less than 2% as measured by HazeGard (ASTM D1003-00).

Embodiment 2

The composition of Embodiment 1, wherein a molded article of the composition with a 3 mm thickness comprising the composition has a haze less than 5%, measured by HazeGard (ASTM D1003-00).

Embodiment 3

The composition of Embodiment 1 or Embodiment 2 comprising, based on the total weight of the composition,
30 wt % to 95 wt % of the first poly(carbonate-siloxane) copolymer;
1 wt % to 20 wt % of the second poly(carbonate-siloxane) copolymer; and
0 wt % to 69 wt % of the bisphenol polycarbonate comprising a bisphenol A homopolycarbonate.

Embodiment 4

The composition of one or more of Embodiments 1 to Embodiment 3, wherein the composition comprises, based on the total weight of the composition,
35 wt % to 75 wt % of the first poly(carbonate-siloxane) copolymer;
3 wt % to 15 wt % of the second poly(carbonate-siloxane) copolymer; and
15 wt. % to 62 wt. % of the bisphenol polycarbonate comprising a bisphenol A homopolycarbonate.

Embodiment 5

The composition of any one or more of Embodiments 1 to 4, wherein the first and second poly(carbonate-siloxane) copolymers independently comprise bisphenol carbonate units of the formula

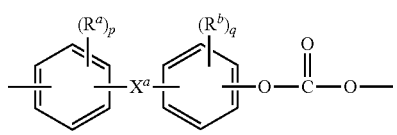

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C(R$^c$)(R$^d$)— wherein R$^c$ and R$^d$ are each independently hydrogen or $C_{1-10}$ alkyl, or a group of the formula —C(=R$^e$)— wherein R$^e$ is a divalent $C_{1-10}$ hydrocarbon group; and siloxane units of the formulas

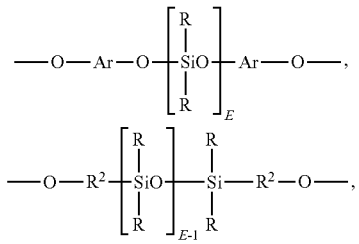

or a combination comprising at least one of the foregoing, wherein

R is each independently a $C_{1-13}$ monovalent hydrocarbon group,

Ar is each independently a $C_{6-30}$ aromatic group, $R^2$ is each independently a $C_{2-8}$ alkylene group, and E has an average value of 10 to 100.

Embodiment 6

The composition of Embodiment 5, wherein the bisphenol carbonate units are bisphenol A carbonate units and siloxane units are of the formula

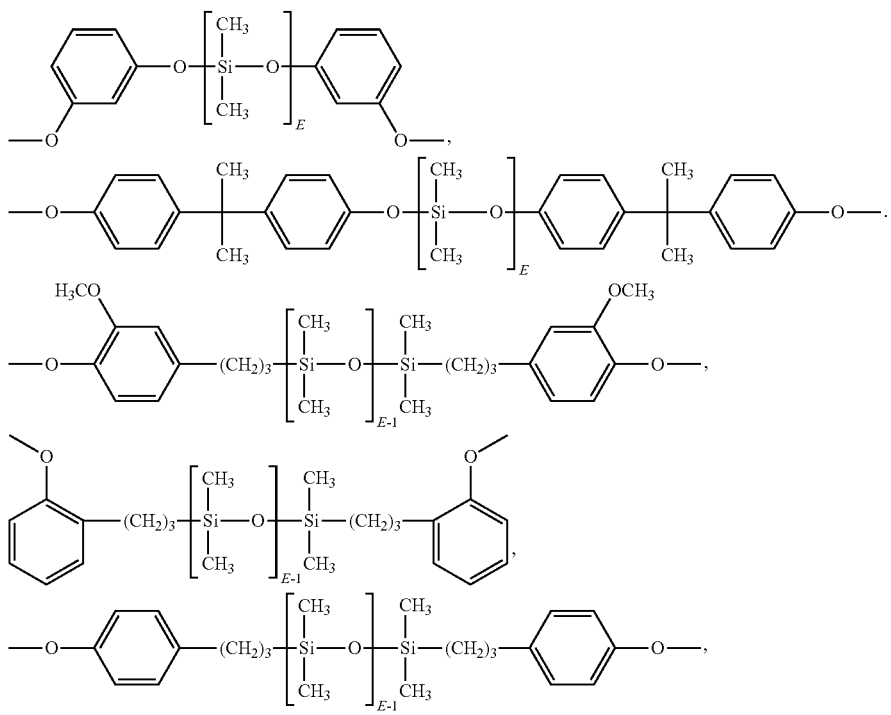

or a combination comprising at least one of the foregoing, wherein E has an average value of 10 to 100.

Embodiment 7

The composition of any one or more of Embodiments 1 to 6, wherein each of the first poly(carbonate-siloxane) copolymer and the second poly(carbonate-siloxane) copolymer independently comprises siloxane units with an average block length of 30 to 60, preferably 30 to 50.

Embodiment 8

The composition of any one or more of Embodiments 1 to 7, wherein the weight ratio of the first poly(carbonate-siloxane) copolymer to the second poly(carbonate-siloxane) copolymer is 5 to 15.

Embodiment 9

The composition of Embodiment 1 to 8 wherein the composition has a melt volume rate ("MVR"), determined in accordance with ASTM D1238 under a load of 1.2 kg at 300° C., higher than 5 and a ductile/brittle transition temperature of less than or equal to −10° C. determined in accordance with ASTM D256-2010 on a molded part having a thickness of 3.2 mm.

Embodiment 10

The composition of Embodiment 9, wherein the composition has a notched Izod impact of greater than 700 J/m as measured according to ASTM D256-10 at 23° C. on a sample of 3.2 mm thickness.

Embodiment 11

The composition of any one or more of Embodiments 1 to 10 further comprising no more than 5 wt. % based on the weight of the composition of a processing aid, a heat stabilizer, an antioxidant, an ultra violet light absorber, a colorant, or a combination comprising at least one of the foregoing.

Embodiment 12

The composition of Embodiment 11 wherein the colorant composition comprises carbon black in an amount of greater than zero and less than 1.5 wt. % based on the total weight of the colorant composition.

Embodiment 13

The composition of any one or more of Embodiment 1 to 12, further comprising a filler composition.

Embodiment 14

The composition of Embodiment 13, wherein the filler composition comprises $TiO_2$.

Embodiment 15

The composition of Embodiment 13 or 14, wherein the filler composition is present in an amount from 1 wt % to about 20 wt % based on the total weight of the composition.

Embodiment 16

The composition of any one or more of Embodiments 1 to 15, wherein a molded article of the composition has reduced aesthetic defects comprises one or more of the following: haze; black streaking; knitline visibility; gate blush; or pearlescence compared to a molded article of a reference composition comprising the same first poly(carbonate-siloxane) copolymer, the same bisphenol polycarbonate, and a second poly(carbonate-siloxane) copolymer comprising carbonate units and siloxane units, wherein greater than 10 mol % of the siloxane units are directly coupled to another siloxane unit.

Embodiment 17

The composition of any one or more of Embodiments 1 to 16, wherein the composition has a tensile yield strength retention of 80% and higher after exposure of an ISO tensile bar for 24 hours to sunscreen under 0.5% strain compared to a non-exposed reference tested according to ISO 22088-3; and an elongation at break retention of 60% and higher after exposure of an ISO tensile bar for 24 hours to sunscreen under 0.5% strain compared to a non-exposed reference tested according to ISO 22088-3.

Embodiment 18

The composition of any one or more of Embodiments 1 to Embodiment 17 further comprising a colorant composition, wherein a molded sample having a thickness of 1 mm formed from the composition has an average L* value of 29 or less as measure by the CIE Lab method, 10 degree observer, D65 illuminant, specular component included, measured in reflectance mode.

Embodiment 19

The composition of any one or more of Embodiments 1 to 18, further comprising a flame retardant, an anti-drip agent or a combination comprising at least one of the foregoing, wherein optionally the flame retardant comprises an alkali metal salt of a perfluorinated $C_1$-$C_{16}$ alkyl sulfonate, an inorganic acid complex salt.

Embodiment 20

An article selected from a molded article, a thermoformed article, an extruded film, an extruded sheet, a honeycomb structure, one or more layers of a multi-layer article, a substrate for a coated article, and a substrate for a metallized article made from the composition of any one or more of Embodiments 1 to 19, optionally
the article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar; or the article is an electronic housing for an adapter, a cell phone, a smart phone, a GPS device, a laptop computer, a tablet computer, an e-reader, a copier, or a solar apparatus,
or the article is an electrical junction box, an electrical connector, an electrical vehicle charger, an outdoor electrical enclosure, a smart meter enclosure, a smart grid power node, a photovoltaic frame, a miniature circuit breaker,
or the article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

The singular forms "a," "an," and "the" include plural referents unless the context clearly dictates otherwise. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A polycarbonate composition comprising:
  a first poly(carbonate-siloxane) copolymer comprising carbonate units and siloxane units, wherein less than 0.5 mol % of the siloxane units are directly coupled to another siloxane unit;
    the first poly(carbonate-siloxane) copolymer comprising
    siloxane units with an average block length of about 10 to about 100, and
    a siloxane content from 5 wt % to 8 wt % based on the total weight of the first poly(carbonate-siloxane) copolymer;
  a second poly(carbonate-siloxane) copolymer comprising carbonate units and siloxane units, wherein less than 0.5 mol % of the siloxane units are directly coupled to another siloxane unit;
    the second poly(carbonate-siloxane) copolymer comprising
    siloxane units with an average block length of 10 to 100,
    a siloxane content from 10 wt % to 30 wt % based on the total weight of the second poly(carbonate-siloxane) copolymer, and
  wherein the weight ratio of the first poly(carbonate-siloxane) copolymer to the second poly(carbonate-siloxane) copolymer is 2 to 20; and
    optionally a bisphenol polycarbonate different from the first poly(carbonate-siloxane) copolymer and the second poly(carbonate-siloxane) copolymer;
    wherein the polycarbonate composition has a total siloxane content of 2.5 wt % to 10 wt % based on the total weight of the composition and
    a molded part of the composition with a 1 mm thickness has a haze of less than 2% as measured by HazeGard (ASTM D1003-00).

2. The composition of claim 1, wherein a molded article of the composition with a 3 mm thickness comprising the composition has a haze less than 5%, measured by Haze-Gard (ASTM D1003-00).

3. The composition of claim 1 comprising, based on the total weight of the composition,
  30 wt % to 95 wt % of the first poly(carbonate-siloxane) copolymer;
  1 wt % to 20 wt % of the second poly(carbonate-siloxane) copolymer; and
  0 wt % to 69 wt % of the bisphenol polycarbonate comprising a bisphenol A homopolycarbonate.

4. The composition of claim 1, wherein the composition comprises, based on the total weight of the composition,
  35 wt % to 75 wt % of the first poly(carbonate-siloxane) copolymer;
  3 wt % to 15 wt % of the second poly(carbonate-siloxane) copolymer; and
  15 wt. % to 62 wt. % of the bisphenol polycarbonate comprising a bisphenol A homopolycarbonate.

5. The composition of claim 1, wherein the first and second poly(carbonate-siloxane) copolymers independently comprise bisphenol carbonate units of the formula

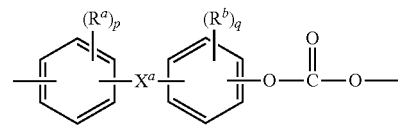

wherein
  $R^a$ and $R^b$ are each independently $C_{1-12}$ alkyl, $C_{1-12}$ alkenyl, $C_{3-8}$ cycloalkyl, or $C_{1-12}$ alkoxy,
  p and q are each independently 0 to 4, and
  $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and siloxane units of the formulas

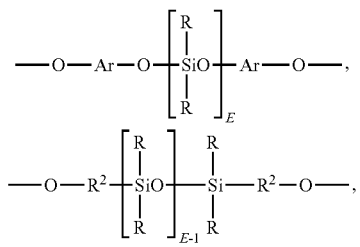

or a combination comprising at least one of the foregoing, wherein

R is each independently a $C_{1-13}$ monovalent hydrocarbon group,

Ar is each independently a $C_{6-30}$ aromatic group, $R^2$ is each independently a $C_{2-8}$ alkylene group, and E has an average value of 10 to 100.

6. The composition of claim 5, wherein the bisphenol carbonate units are bisphenol A carbonate units and siloxane units are of the formula

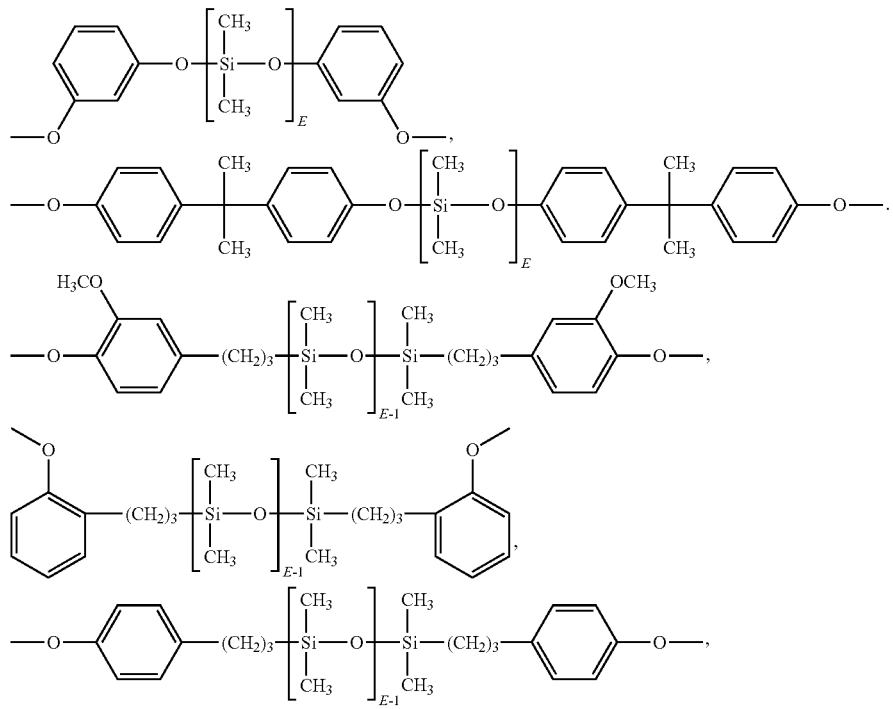

or a combination comprising at least one of the foregoing, wherein E has an average value of 10 to 100.

7. The composition of claim 1, wherein each of the first poly(carbonate-siloxane) copolymer and the second poly(carbonate-siloxane) copolymer independently comprises siloxane units with an average block length of 30 to 60.

8. The composition of claim 1, wherein the weight ratio of the first poly(carbonate-siloxane) copolymer to the second poly(carbonate-siloxane) copolymer is 5 to 15.

9. The composition of claim 1 wherein the composition has a melt volume rate ("MVR"), determined in accordance with ASTM D1238 under a load of 1.2 kg at 300° C., higher than 5 and a ductile/brittle transition temperature of less than or equal to −10° C. determined in accordance with ASTM D256-2010 on a molded part having a thickness of 3.2 mm.

10. The composition of claim 9, wherein the composition has a notched Izod impact of greater than 700 J/m as measured according to ASTM D256-10 at 23° C. on a sample of 3.2 mm thickness.

11. The composition of claim 1 further comprising no more than 5 wt. % based on the weight of the composition of a processing aid, a heat stabilizer, an antioxidant, an ultra violet light absorber, a colorant, or a combination comprising at least one of the foregoing.

12. The composition of claim 11 wherein the colorant composition comprises carbon black in an amount of greater than zero and less than 1.5 wt. % based on the total weight of the colorant composition.

13. The composition of claim 1, further comprising a filler composition.

14. The composition of claim 13, wherein the filler composition comprises $TiO_2$.

15. The composition of claim 13, wherein the filler composition is present in an amount from 1 wt % to about 20 wt % based on the total weight of the composition.

16. The composition of claim 1, wherein a molded article of the composition has reduced aesthetic defects comprises one or more of the following: haze; black streaking; knitline visibility; gate blush; or pearlescence compared to a molded article of a reference composition comprising the same first poly(carbonate-siloxane) copolymer, the same bisphenol polycarbonate, and a second poly(carbonate-siloxane) copolymer comprising carbonate units and siloxane units, wherein greater than 10 mol % of the siloxane units are directly coupled to another siloxane unit.

17. The composition of claim 1, wherein the composition has a tensile yield strength retention of 80% and higher after exposure of an ISO tensile bar for 24 hours to sunscreen under 0.5% strain compared to a non-exposed reference tested according to ISO 22088-3; and an elongation at break retention of 60% and higher after exposure of an ISO tensile bar for 24 hours to sunscreen under 0.5% strain compared to a non-exposed reference tested according to ISO 22088-3.

18. The composition of claim 1 further comprising a colorant composition, wherein a molded sample having a thickness of 1 mm formed from the composition has an average L* value of 29 or less as measure by the CIE Lab method, 10 degree observer, D65 illuminant, specular component included, measured in reflectance mode.

19. The composition of claim 1, further comprising a flame retardant, an anti-drip agent or a combination comprising at least one of the foregoing, wherein optionally the flame retardant comprises an alkali metal salt of a perfluorinated $C_1$-$C_{16}$ alkyl sulfonate, an inorganic acid complex salt.

20. An article selected from a molded article, a thermoformed article, an extruded film, an extruded sheet, a honeycomb structure, one or more layers of a multi-layer article, a substrate for a coated article, and a substrate for a metallized article made from the composition of claim 1, optionally
- the article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar; or the article is an electronic housing for an adapter, a cell phone, a smart phone, a GPS device, a laptop computer, a tablet computer, an e-reader, a copier, or a solar apparatus,
- or the article is an electrical junction box, an electrical connector, an electrical vehicle charger, an outdoor electrical enclosure, a smart meter enclosure, a smart grid power node, a photovoltaic frame, a miniature circuit breaker,
- or the article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

* * * * *